United States Patent [19]

Nadkarni et al.

[11] Patent Number: 4,588,870

[45] Date of Patent: May 13, 1986

[54] RESISTANCE WELDING ELECTRODE CAP

[75] Inventors: Anil V. Nadkarni, Mentor; Prasanna K. Samal, Lyndhurst, both of Ohio

[73] Assignee: SCM Corporation, New York, N.Y.

[21] Appl. No.: 682,874

[22] Filed: Dec. 18, 1984

[51] Int. Cl.4 .............................................. B23K 11/30
[52] U.S. Cl. ..................... 219/119; 219/118
[58] Field of Search ........................ 219/119, 120, 118

[56] References Cited

U.S. PATENT DOCUMENTS 2,138,388 11/1938 Platz ..................................... 219/120
4,045,644 8/1977 Shafer et al. .......................... 219/119

FOREIGN PATENT DOCUMENTS 1938548 2/1970 Fed. Rep. of Germany ...... 219/119
2424093 12/1979 France ................................ 219/119
155239 12/1980 German Democratic Rep. ..................... 219/120

Primary Examiner—Clifford C. Shaw
Assistant Examiner—C. M. Sigda
Attorney, Agent, or Firm—R. A. Sturges; T. M. Schmitz

[57] ABSTRACT

An improved resistance welding electrode cap adapted to being internally cooled with a flow of coolant has a main body portion with a nose root at one end and an electrical and coolant connection projecting from the other, the area of the root being substantially smaller than that of the direct projection of the main body portion, a pronounced nose projecting from the root. The whole nose is of dispersion-strengthened copper, as is at least the main body portion. Such cap provides astonishingly improved performance for resistance welding, even of galvanized steel, and particularly of double-sided, galvanized cold-rolled steel sheet.

13 Claims, 10 Drawing Figures

RESISTANCE WELDING ELECTRODE CAP

This invention relates to resistance welding and more particularly to an improved electrode cap for use in a resistance welding device, particularly one for welding double-sided galvanized steel.

BACKGROUND OF THE INVENTION

Resistance welding is used widely to join the metal members; for joining steel sheets and the like the process often is automated. Typically, a pair of steel sheets are overlapped, opposed electrodes are brought in from either side to exert substantial pressure on the joint-to-be, a very high current is passed between the electrodes, and a "nugget" is produced that joins the sheets.

The tip of such electrode, which contacts the metal to be joined usually fails because of excessive "mushrooming", a spreading, often splitting, deformation. It is customary to raise welding amperage periodically as such deformation increases with use, this in an attempt to keep the current density desirably high for the formation of suitable nuggets. Eventually, the accumulation of mushrooming and wear no longer can be tolerated and the electrode must be replaced, or, in some cases, redressed. For economy and ease of replacement, electrodes having disposable, replaceable caps today are the most generally used electrode types for production operations.

Electrode force (i.e., pressure exerted by the electrodes on the area to be welded), weld current, and weld time measured in cycles, determine weld size and strength. Compared to welding bare steel sheet, the contact resistance for joining galvanized steel sheet is considerably lower. This is due to the softness of zinc, its fairly low melting point, and its high electrical conductivity. Also, mushrooming zinc tends to ring the weld and shunt current outside the area of the weld. To compensate for this wasted current, spot welds in galvanized steel sheet require higher amperages and longer times than spot welds in uncoated sheets of like gauge. Additionally, the caps fail much more rapidly when used to weld galvanized sheet than bare steel sheet because zinc combines with copper of the caps, forming brass. That has higher electrical resistivity than the copper or original special copper alloy from which the cap was formed. As heat softens the tip, its face starts to mushroom and enlarge. Thus, the resistance welding of zinc-coated sheet, and particularly of double-sided, zinc-coated sheet, is an especially severe service for the caps. Nevertheless, such welding is increasingly sought in the assembly of rust-resisting articles, particularly automobiles.

The manufacture of automobiles is the largest application of resistance welding today. Until fairly recently virtually all the caps generally used in such service were of high strength, high conductivity copper alloys such as copper alloyed with a little chromium, zirconium, cadmium, cobalt, nickel, beryllium, tungsten, molybdenum, or a combination of these alloying agents. Representative alloys of this sort can contain about 0.1% to about 0.2% zirconium and about 0.6% to about 1% chromium. (For brevity, such metals and alloys may be referred to from time to time in this specification simply as "copper alloys", because a copper-base alloy has been for so long the mainstay cap material for resistance welding operations in automobile production).

The shapes of the tips of caps today widely offered commercially are generally four to six in number; apart from their tips their main outlines usually are cylindrical with the maximum cylindrical diameter being between about 12 mm and about 19 mm. Such cap is cooled by a stream of water flowing into and out of an inner recess of the cap from a "shank", i.e., an adapter, that delivers such coolant and conducts it away as well as bringing the electrical power to the cap. For simplicity, the welding tip of a cap here can be termed to be at the "front" of the main body portion of and the connector to such shank at the "rear" of the main body portion of a cap. While a variety of connection types have been proposed for fastening cap to shank, i.e., a threaded joint, etc., the type most generally used now is a locking taper joint (i.e., an RWMA—Resistance Welding Manufacturers' Association—number such as 4, 5, or 6). The cap can have a female or a male taper for such connections, the former probably being the more popular.

Six commercial welding cap end shapes are represented in many suppliers' brochures, and they can be characterized as follows: Pointed—having a frustoconical front end of appreciable taper that usually starts at or near the periphery of the broadest cylindrical section of the cap and ends in a small face; Dome—a rounded face of fairly high arch that extends across the end of such cylindrical section; Flat—a flat welding face which is of the same diameter as such cylindrical section; Offset—such cylindrical section is beveled upwardly from one side to leave a small lunar face on the front end; Cone—a blunt, shallow frustoconical tip projects from such cylindrical section; and Radius—which is a slightly convex bulge clear across the end of such cylindrical section.

There have been relatively few, if any, widely adopted departures shapes, and it would appear that such departures have not been adopted but rather are shunned by the American automobile manufacturing industry. One such "nonconforming" cap was brought to this country a few years back by Renault of France; it was made of a conventional alloy copper believed to contain, nominally, 0.6–0.8% chromium and 0.15% zirconium. Its main body portion was cylindrical, about 15.9 mm (⅝") diameter, with a female taper at the rear end to fit onto an adapter and handle electricity and water in a customary manner. A cylindrical nose projected about 8 mm outwardly from the front end; it was coaxial with the main part of the body. This nose had three or more horizontal circular grooves cut into it to give the impression of a series of projecting annular rings normal to the axis of and being disposed one after the other along the length of the nose. The outer diameter of such ring was almost 8.25 mm and the depth of each groove about 0.875 mm. This, ostensibly, was to permit the expected mushrooming that ensued to break off from time to time, thereby periodically tending to reform the welding face or tip into a diameter that more nearly approximated the original. This cap seems to have found few takers here, if any, to the knowledge of applicants, and it has become somewhat of a curiosity. U.S. Pat. No. 4,476,372 of Oct. 9, 1984, appears to be virtually a copy of such "Renault Cap".

Another earlier-proposed internally-cooled welding cap having somewhat of a nose is described as being made from copper, tungsten, molybdenum, or their alloys, or some precious metal alloys. It is depicted in FIG. 1 of U.S. Pat. No. 3,909,581. Such "copper alloy" tip was held in a surrounding retainer of less expensive metal, which retainer fitted to an electrode shank or adapter; the less expensive metal claimed was aluminum, iron, zinc, and their alloys. An object was to save on the more expensive tip material and have a disposable cap that did not require redressing for economy. Conventional tip shapes at least approximating some commercially popular ones are depicted in FIGS. 2a through 2g of this patent, as is a type of mushrooming in FIG. 5b.

The Briggs U.K. patent No. 1,177,351, applied for in 1966 and published in 1970, first suggested the use of dispersion-strengthened copper in a resistance welding electrode, specifically as the hot end thereof which contacted the workpiece. The remainder (i.e., the main body portion) was to be of copper or a copper alloy. The preferred dispersion-strengthened copper was indicated to have alumina as its disperse refractory phase in a concentration equivalent to 1-4 volume percent of aluminum.

A major step in the use of dispersion-strengthened copper for resistance welding electrode caps occurred about 1975. This is represented by the Shafer and Nadkarni U.S. Pat. No. 4,045,644 of 1977. Here, the dispersion-strengthened copper stock then produced by hot extrusion was formed into electrodes and caps which were cold worked ("upset") to reorientate at least part of the grain structure and thereby improve serviceability.

Further progress in this art is disclosed in the very recent Nadkarni et al U.S. Pat. No. 4,478,787. FIGS. 1 and 2 of that patent depict a cap formed from dispersion-strengthened copper that has a steel jacket swaged around the main part of the body. When such jacket is polished, it glistens; the electrode bears the fanciful trademark Silver Bullet. Such mark, and U.S. Pat. Nos. 4,045,644 and 4,478,787, are owned by the assignee of the instant patent application, SCM Corporation. The teachings of these patents are incorporated by reference in this application.

Additionally, there have been some bimetal welding electrodes patented in recent years wherein the front end is either dispersion-strengthened copper itself or such material sheathed at the tip with a layer of high-conductivity copper. Such articles are adapted for water cooling, and the back end thereof is another metal, typically high-conductivity copper. The front ends shown appear to be fairly blunt, with the broadest diameter equal to or closely approaching the diameter of the main body portion. U.S. Pat. Nos. 4,071,947; 4,288,024; and 4,345,136, to Russel. A. Nippert, are representative here.

Whether the caps for resistance welding in the production of automobiles are of the "copper alloy" composition type or whether they (or at least their tip ends) have been made from dispersion-strengthened copper, the shapes of such cap tips has quite consistently conformed essentially to one or more of the conventional six shapes described above. None of the foregoing "copper alloy" types, of either a "conforming" or a "non-conforming" configuration, have any reputation for being even fairly durable for use in the resistance welding of galvanized steel, and particularly of double-sided galvanized sheet. The caps made of dispersion-strengthened copper showed some modestly improved life in such rigorous service, and this will be demonstrated by actual exemplification to follow.

BROAD STATEMENT OF INVENTION

The instant resistance welding cap is adapted to be internally cooled with a flow of coolant. Said cap has a main body portion with a nose root at one end and an electrical and coolant connection projecting from the other end. The area of the nose root is substantially smaller than that of the direct projection of said main body portion. From the nose root there projects a pronounced substantially smooth nose which extends to a welding tip. The cap is characterized by having of dispersion-strengthened copper its whole nose as well as at least said main body portion to which the nose is rooted. Preferably the whole cap, including said projecting electrical and coolant connection as well as said main body portion and nose, and except for optional external jacketing, is of dispersion-strengthened copper.

BRIEF DESCRIPTION OF DRAWINGS

FIGS. 2, 3, 4 and 6 have slightly tapered, e.g., 7 degrees or less, pronounced, almost cylindrical noses that project the main body portion and are coaxial therewith.

FIG. 1 is a commercial cap of the so-called "pointed" style.

FIG. 2 represents a forerunner of the instant cap.

FIG. 3 represents an early prototype of the instant cap.

FIG. 4 represents an optionally steel-jacketed prototype of the instant cap.

FIG. 6 represents an optional bimetal adaptation of the instant cap.

FIG. 10 is a cross sectional elevation of an electrode cap like that of FIG. 4, but it is made all of dispersion-strengthened copper and has a male locking taper connection.

DETAILED DESCRIPTION OF THE INVENTION

Figure 1:
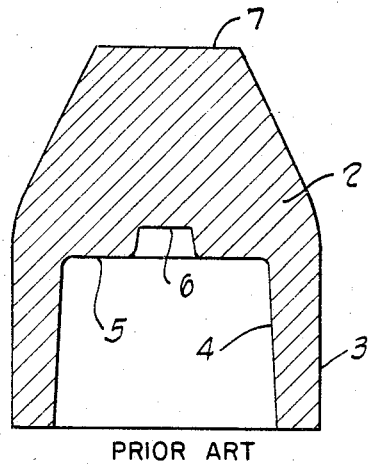
FIGS. 1, 2, 3, 4, 6 and 10 are cross sectional elevations of electrode caps made of the same kind of dispersion-strengthened copper (containing alumina equivalent to about 0.6% weight aluminum). Each has a female locking taper connection (RWMA #5) projecting from the rear of a round main body portion. The overall lengths of the caps of FIGS. 1 and 2 are the same (0.88" or 22.3 mm); the overall length of the caps of FIGS. 3, 4 and 6 are the same (0.8" or 20.3 mm). The maximum diameters ($\frac{5}{8}$" or 15.9 mm) are the same for the caps in all the figures. The diameters of the original welding faces in FIGS. 1, 2, and 3 all are $\frac{1}{4}$" (6.35 mm), for FIGS. 4, 6 and 10 such diameters all are 5/16" (7.93 mm).

Referring to FIG. 1, which typifies a presently widely used dispersion-strengthened copper resistance welding electrode, main body portion 2 of the cap tapers upwardly in a frustroconical shape that ends in welding tip 7 at the top (front end). From the back end of the body portion there projects the connection for cooling water and electricity. It has vertical exterior wall 3 and inner wall 4, wall 4 being in the form of a female locking taper. There is a "dimple", 6, that projects slightly into the interior of the main body portion at its rear (base 5). In shop parlance a connector end with or without a dimple is often called a "waterhole"). A shank (adapter), not shown but of male taper complementing that of wall 4, fits into the rear connection of inner wall 4 for use; normally such shank penetrates to within 3 to 4 mm of base 5. A flow of water entering from a conduit in the shank scours base 5 and dimple 6, then exits from another conduit in the shank. The shank also conducts the electric power to and from a cap through the taper-to-taper contact.

Figure 2:
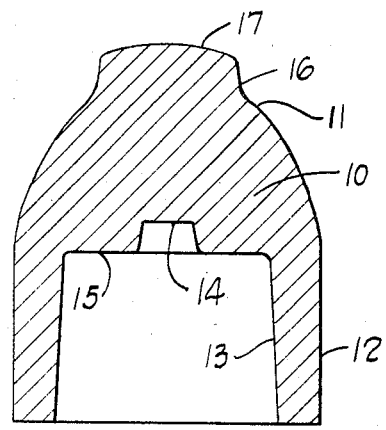

Referring to FIG. 2, main body portion 10 of the cap tapers upwardly in a slightly arched, almost frustoconical shape to shoulder 11. From said shoulder there projects and is rooted short nose 16 (about 3.2 mm long), terminating in welding face 17. Face 17 is convex (radius=0.325" or 8.25 mm). From the back end of body portion 10 there projects the connection for cooling water and electricity. It has vertical exterior wall 12 and inner tapered wall 13. Dimple 14 projects inwardly from base 15 of main body portion 10. The connection part of the cap is identical in geometry to that of FIG. 1 for use in the same manner.

In this specification, the main body portion of the inventive cap described and defined herein constitutes that volume of cap between the root of the nose as one boundary and, as the other boundary, that surface where the female or male connection for coolant and electricity starts or springs from such main body portion. Thus, for a "female" cap such as shown in FIG. 2, the main body portion should be understood to extend from base 15 upwardly to the root of nose 16. Such root is ⅛" or 3.17 mm below the top end of tip 17. For a corresponding "male" cap, the main body portion should be understood to be that volume of cap between (a) the plane from which the connector (male taper) projects, and (b) the root of the nose. Accordingly, it follows that the inventive cap has a nose, a main body portion therebehind which extends back to where it can contact the flow of internal coolant, and a connection for such coolant and power. For efficiency of production, it is preferred to make the entire cap of dispersion-strengthened copper, except for any external jacketing (which is optional and will be illustrated later). Optionally, also the connection for coolant and power or the rear part of it can be of another metal such as quite pure copper because that is the low temperature end of the cap; one such embodiment is depicted also in a figure which follows.

Figure 3:
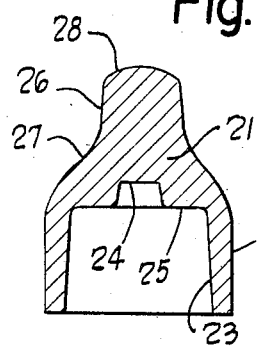
Figure 4:
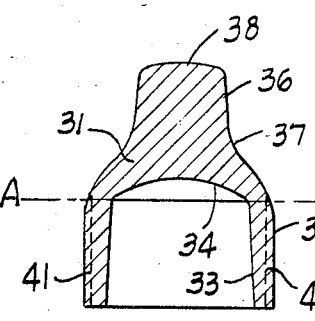

Referring to FIG. 3, main body portion 21 of the cap slopes outwardly in a dome-like manner (radius 0.625" or 15.9 mm) to shoulder 27. From its root there projects nose 26 terminating in welding face 28. Face 28 is convex (radius=0.375" or 9.55 mm). The base of said body portion, item 25, is fitted with dimple 24. From the back end of body portion 21 there projects the connection for cooling water and electricity. The connection has vertical exterior wall 22 and inner tapered wall 23. The connection part of the cap is identical in geometry to that of FIG. 1 for use in the same manner. Referring to FIG. 4, main body portion 31 ascends in dome-like fashion (same radius as in FIG. 3) to root 37, of nose 36. Nose 36 terminates in slightly convex tip 38, which is 5/16" (7.94 mm) in diameter, and has a radius of 1" (25.4 mm). The rear end or base 34 of the main body portion is arcuate and the cooling water and electrical connection like that of the preceding three figures projects from the rear of said main body portion. The outer vertical wall of the connection is item 32, and the inner tapered wall is item 33. The vertical dotted lines extending downwardly and parallel to vertical outer wall 32 represent the inner wall of an optional steel jacket that is swaged around the cap (as described in U.S. Pat. No. 4,478,787). If such jacket were to be used, the bottom of the waterhole (base 33 of the main body portion) and tapered inner wall 33 are of dispersion-strengthened copper (as is all the rest of the cap, except for such jacket). Through this FIG. 4 is marked a line A—A to indicate an imaginary horizontal plane; it denotes the region of horizontal cross section from which the next figure is taken.

Figure 5:
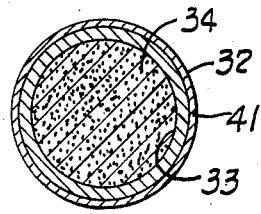
FIG. 5 is a horizontal cross section of FIG. 4 taken through section A—A noted in FIG. 4.

Referring, then, to FIG. 5 (the cross section through the horizontal plane in FIG. 4 denoted by line A—A item 34 represents the base of the main body portion which itself is of dispersion-strengthened copper, item 32 the outer periphery of the steel jacket around the large diameter portion of the cap of FIG. 4, item 41 the steel jacket and item 33 the tapered wall of dispersion-strengthened copper.

Figure 6:
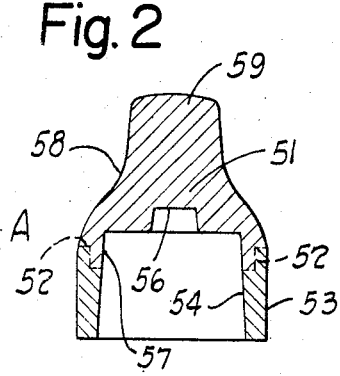

Referring to FIG. 6, the geometry is identical to that of FIG. 4 except for the waterhole. A main difference between these caps is the optional use of a brazed-on portion of high conductivity copper that forms the rear end of the connector portion of FIG. 6 (which for this cap is an optional feature). Thus, item 52 is a brazed joint between the rearward high-conductivity copper portion of the connector and the forward dispersion-strengthened copper part of the rest of the cap. The remainder of the numbered items are as follows: item 51 represents the main body portion of the cap terminating in root 58 from which nose 59 projects; item 53 is the vertical cylindrical outer wall of the water and electrical connection; item 54 is that part of the tapered inner wall of the connection made of high-conductivity copper; item 57 is that part of the tapered inner wall made of dispersion-strengthened copper. Dimple 57 projects into the main body portion (item 51) of the cap.

It should be noted that the dispersion-strengthened copper part of the instant cap always is disposed to come into direct contact with and be directly scoured and cooled by the internal coolant such as the customary flow of water; this is true whether all or part of the connection (such as a female or male locking taper connection) portion of the cap or one or more bands of jacketing around part of the cap exterior is of some other material.

The importance of this coolant contact resides in the fact that at least the hot end of the inventive cap in service is of dispersion-strengthened copper, it runs hotter than a copper alloy cap, and it gets desirable cooling in as direct a way as is possible. The inventive cap stays generally somewhat more slender (and "self-dressing") at and near its "business end" than any of the caps customarily described above that are used today by the U.S. automobile industry (whether such customary caps be made of copper alloy or dispersion-strengthened copper). The novel nose here does not have the same amount of bulk for heat transfer and lateral support, either initially or during its useful life. However, the inventive cap can be fashioned to attain its optimum length of nose from root to tip (which can in some cases be as long as about 16 to 20 mm for a ⅝" or 15.9 mm diameter cap) for surprisingly prolonged usage before replacement.

Figure 7:
FIGS. 7, 8 and 9 represent the front ends (tips) of noses that can be made and used in accordance with the present invention for specialty purposes.
Figures 8, 9:

FIGS. 7, 8 and 9, as noted above, are special tip end shapes for noses of the inventive cap. The nose can run almost directly rearwardly from such tip or taper outwardly a bit towards its root.

Figure 10:
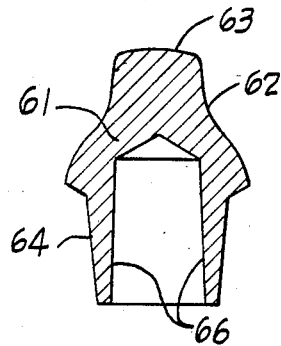

FIG. 10 is a version of the cap of FIG. 4 made entirely of the same kind of dispersion-strengthened copper as the cap of FIG. 4, but having a RWMA No. 5 male locking taper 64 for a connection of water and power. Main body portion 61 has a nose root at about level 62 at its forward end (such root in this Figure and in FIGS. 2, 3, 4 and 6 also, and in this specification generally) is the area occupied at the forward end of said main body portion 61 by the base of the nose and is reckoned exclusively of any transitional fillet therebetween, which fillet customarily is used in metal work to avoid too abrupt a transition in direction with an accompanying weakening at such transition). Projecting from the rear end of main body portion 61 is the connection having RWMA male taper No. 5 on its outside and vertical wall 66 on its inside. The cavity for water ("waterhole") terminates in a blunt cone that penetrates well into the main body portion.

The nose of this cap projects from root 62 and is 6.35 mm long, and it terminates in a 7.9 mm diameter tip 63 from the 9.5 mm diameter root. The tip is slightly convex with radius of 25.4 mm. Radius of curvature of the shoulder of the main body portion 61 is 15.9 mm, like that of FIGS. 3, 4, and 6.

The preferred inventive cap here is substantially circular in any horizontal cross section with the nose being coaxial with the main body portion and the connection for power and coolant. It can replace current conventional caps simply and directly. However, there is no reason why parts of the inventive cap such as the main body portion or the nose need to be of circular cross section. Instead of, say, the main body portion and particularly the nose being of a cylindrical or slightly frustoconical configuration, such elements can be prismatic or frustopyramidal. The end of the nose need not be round of lunar; instead it can be shaped, for example, generally suggestive of the letter cee, ell, eye, or ess where such special shape is desired or advantageous. In fact, there is a possibility of using stylized spot weld made with the instant novel electrode to be a mark of recognition like a trade or service mark.

The dispersion-strengthened copper advantageous for efficiency and economy in the manufacture of the inventive cap is dispersion strengthened with alumina broadly in concentration between about 0.2 and about 0.7 weight percent measured as equivalent aluminum; preferably such value is between about 0.25 and about 0.6. Other dispersion-strengthening refractory oxides can be used such as silica, titania, zirconia, beryllia, thoria, yttria, or magnesia to give a substantially equivalent volume level as the aluminum oxide weight percentages stated above. It should be noted that below about 0.2 weight percent alumina in otherwise substantially pure dispersion-strengthened copper the tensile strength begins to drop off rather rapidly, while above about 0.7 weight percent alumina such dispersion-strengthened copper becomes very difficult to work and tends to crack. The room temperature tensile strength properties of such dispersion-strengthened copper are illustrated on a chart on page 712 of the *AMS Metals Handbook*, 9th Edition, Volume 7, published by the American Society for Metals, Metal Park, Ohio, in 1984.

The dispersion-strengthened copper most widely used today is made by an internal oxidation process wherein a particulate alloy of a tiny portion of elemental aluminum alloyed with copper is oxidized by an essentially cuprous oxide oxidant. The resulting elemental copper formed from such oxidant can leave zones of comparative weakness in the ultimately consolidated dispersion-strengthened copper stock. However, if much or all of such cupreous oxidant is replaced by an alternative oxidant that leaves a small residue of strengthening metal in the product when such oxidant gives up its oxygen to form the alumina dispersoid in the copper matrix metal, the result can be a hardening and/or toughening of the product. Such strengthening metal can be, for example, inclusions of tungsten and/or molybdenum in a proportion of about 0.5–6 (generally 2–4) weight percent or even more. These can be thought of as "metalliferous fortifiers" for the dispersion-strengthened copper; also, such fortifiers can be incorporated into the product in ways other than as oxidants, if desired, e.g., in particulate elemental or alloy form, as a directly added compositing component of dispersion-strengthened copper or as a carbide or boride powder such as tungsten carbide, tungsten boride, titanium carbide, or silicon carbide. The teachings of copending U.S. patent application Ser. No. 561,035 of Dec. 13, 1983, in this regard, are incorporated herein by reference.

Also for cold working we prefer a slight taper to the nose portion of the cap, the root area of the nose being slightly larger than that of the end or tip of the nose with a taper not generally in excess of about 10°. The length to narrowest width ratio of a preferred tapered nose is not substantially in excess of about 2:1 for rigidity and resistance to bending under operating conditions. While the nose can be and preferably is slightly conical, approaching the cylindrical, it also could have a slightly trapezoidal vertical cross section approaching the rectangular with a horizontal cross section of a rectangle, a square, a trapezoid, oval, etc.

A taper of the instant nose can be somewhat more blunt without too much sacrifice. However, as such taper increases to substantially more than about 20°, a good part of the self-dressing property of the instant electrode can be lost, and the current may have to be adjusted to an undesirably high value quite early in the life of the cap for maintaining desired current density and suitable nugget size as the tip wears away and gets larger and larger in area, even without much mushrooming. The root area of the instant nose rarely needs to be as much as one-half that of the normal (direct) projection of thre main body portion of the cap. Thus, for a nominally ⅝" (15.9 mm) maximum outside diameter cap such as illustrated in several Figures here, the root of an almost cylindrical nose thereof rarely is as much as 11 mm in diameter, and usually is much less.

The most practical coolant is water, but other fluids can be used. While double-sided galvanized steel has been singled out as an especially rigorous service for a resistance welding electrode cap, the instant caps do well also on conventionally hot dipped or electrogalvanized steels such as cold rolled steel sheet, but also sherardized iron and steel and other zinc-coated and otherwise coated or uncoated metals including ternecoated steel, aluminized sheet steel, vinyl-covered or prepainted steel (e.g., with powder paint or liquid paint), uncoated iron and steel, aluminum, Zincrometal (a trademark of Diamond Shamrock Corporation), and Galvalum (a trademark of Dow Chemical Company).

While the maximum diameter of the instant caps usually will be between about 12 and about 25 mm, the length of nose from root to tip between about 5 and about 20 mm, and the diameter of the original welding tip or "face" on the nose between about 5 and about 10 mm, clearly larger electrode caps of like structure and conformation can be made for handling more power and smaller ones for handling less power.

The bottom of the waterhole in a cap can have a variety of shapes where the water comes into direct contact with the back or rear of the main body portion. Accordingly, one can use not only the popular dimple on a flat or almost flat bottom or a bottom with an arcuate center portion, but also a fully dished bottom, any one of these optionally having grooves, vanes and/or other small structure that can impart additional swirl and turbulence to the flow of coolant. It should be remembered to leave at least a few millimeters of dispersion-strengthened copper between any coolant boundary and a nose worn down to its root.

For nominally $\frac{1}{2}''$ to $\frac{3}{4}''$ maximum diameter caps (12.7–19.1 mm) a desirable cooling water rate is about $2\frac{1}{2}$ gallons per minute (9.5 liters per minute), and generally much less than about $\frac{1}{2}$ gallon per minute (1.9 liters per minute) can be too little; larger caps can require even more.

An essentially smooth wall on the nose of the cap, preferably with a slight taper or flare outwardly and downwardly from tip to root of the nose, allows for cold forming efficiency. Machining, cutting, grinding and other expense and waste need not be needed or tolerated a great deal or at all. Rather, pressing, drawing, punching or other metal-deforming techniques can be used to make the cap from stock.

As noted above, the transition between main body portion and nose usually is in the form of a fillet of short radius, or it is curved or flared. However, for consistency in estimating the area of the nose root, such curve or fillet or flaring is ignored. The root is reckoned to be that area covered by projection of side walls reaching backwardly into an abrupt, imaginary intersection with said main body portion. In a cap like the ones shown in FIGS. 2, 3, 4, 6, and 10, where the nose and main body portion are coaxial, the root, of course, will have the cross section of a circle.

The nose wall preferably is smooth. It could be vertically grooved, if desired, or even slightly threaded, but such things can add expense and are not needed. The nose clearly does not have to be coaxial with the main body portion.

Customary ways to consolidate dispersion-strengthened copper stock for the instant caps are taught in U.S. Pat. Nos. 4,045,644 and 4,478,787 (e.g., extrusion in a can, say of copper or steel, or swaging in a case). These patents also teach cap-forming cold working operations that are useful here too. The U.S. Pat. No. 4,045,644 patent addresses the reorientation of grain structure ("upsetting") of an electrode cap made from extruded stock, and this technique can be used if desired in making the present cap. The present cap also can be machined by cutting stock to shape, but cutting obviously is more wasteful than cold forming; therefore the latter is preferred to limit machining such as with a lathe to as little as is possible.

The following examples summarize resistance welding results using caps of a conventional RWMA "pointed" configuration (i.e., caps like that of FIG. 1) and some having controlled mushrooming (CM) designs. Unless otherwise expressly specified, all percentages herein are weight percentages, and all parts are parts by weight.

The test conditions were as follows:

Material: Two sheets of double-sided 0.035" (0.9 mm) galvanized cold rolled steel sheets to be spot welded together.

Machine: Taylor Winfield model EB3-8-5-single station press welder. The machine has a throat depth of 8" (20.3 cm) and a 50 KVA power transformer.

Electrodes: $\frac{5}{8}''$ (15.9 mm) diameter female caps, some like that shown in FIG. 1 and some with said CM designs.

Weld Current:

For FIG. 1 Caps: Start at 10,000 amperes and gradually increase current to 13,500 amperes during the first 250 conditioning welds. Continue welding at this current level until weld failure occurs.

For "CM" Caps: Start at current level required to make a weld nugget of about 0.150" (3.8 mm) diameter and increase current as required to reach a nugget size of 0.200" (5.8 mm) diameter during the first 250 to 275 welds. Continue welding until the nugget size drops to 0.150" diameter or below, then increase current to bring the nugget size back to 0.200" dia. Continue this procedure until the current level reaches 13,500 amperes. The test is terminated when weld failure occurs at 13,500 amperes.

Weld Force: 600 pounds (273 kg).
Weld Time: 15 cycles.
Hold Time: 95 cycles.
Squeeze Time: 95 cycles.
Off Time: 95 cycles.
Weld Rate: 12 spots/minute.
Water Flow: 0.5 gallons/minute (1.9 liters/minute).

Procedure: Electrodes are installed on the machine and aligned so that they produce a $\frac{1}{4}''$ (6.35 mm) diameter full carbon imprint. Sheet metal is cut into 6"×48" (15.2 mm×112 cm) panels and welds are made about 1" (2.54 cm) apart.

Weld nugget dimensions are routinely measured at 250 intervals, but more frequently if there are indications of deteriorating weld quality. Three welds 1" (2.54 cm) apart are made on 1" (2.54 cm) wide coupons. The two outer welds are then pulled and the button size is measured in longitudinal and transverse directions. The equivalent nugget diameter is determined by taking a square root of the product of longitudinal and transverse dimensions.

EXAMPLE 1

Dispersion-strengthened copper caps like those of FIG. 1 were tested. The test results were as follows:

TABLE 1

| WELDING TEST RESULTS ON FIG. 1 DISPERSION-STRENGTHENED COPPER CAPS | |
|---|---|
| Weld No. | Equivalent Weld Nugget Diameter (inches) |
| 250 | .223 |
| 500 | .210 |
| 750 | .233 |
| 1000 | .163 |
| 1250 | .175 |
| 1500 | .214 |
| 1750 | .188 |
| 2000 | .224 |
| 2250 | .184 |
| 2500 | .095 |

The FIG. 1 caps thus produced 2250 acceptable welds. The test was terminated at 2500 welds because the nugget diameter then produced was well under 0.150", and that is considered unacceptable.

EXAMPLE 2

This test was conducted on the FIG. 2 CM caps. The protruding nose at the weld face was 0.250" diameter and about 0.125" long. The weld face had a 0.325" radius used to facilitate liquid zinc to push out of the weld zone and thus minimize the deleterious effects of zinc on the cap. However, this radius is available only in the beginning when zinc attack is at the maximum; the weld face eventually flattens out after a few hundred welds.

The weld test performance on these caps was as shown in Table 2.

TABLE 2
WELDING TEST RESULTS ON CONTROLLED MUSHROOMING (FIG. 2) DISPERSION-STRENGTHENED COPPER CAPS

| Weld No. | Weld Current (Amperes) | Equivalent Weld Nugget Diameter (inches) |
|---|---|---|
| 250 | 9,000 | .165 |
| 500 | 10,000 | .137 |
| 750 | 11,000 | .255 |
| 1000 | 11,500 | .222 |
| 1250 | 12,000 | .216 |
| 1500 | 12,500 | .253 |
| 1750 | 13,000 | .260 |
| 2000 | 13,000 | .273 |
| 2250 | 13,000 | .260 |
| 2500 | 13,000 | .254 |
| 2750 | 13,000 | .225 |
| 3000 | 13,500 | .215 |
| 3250 | 13,500 | .230 |
| 3500 | 13,500 | .212 |
| 3750 | 13,500 | .210 |
| 4000 | 13,500 | .218 |
| 4250 | 13,500 | .178 |
| 4500 | 13,500 | — |

The caps of FIG. 2 thus produced almost twice the number of acceptable welds as the FIG. 1 caps in Test 1. Also, the FIG. 2 produced full size nuggets at much lower current levels than can the FIG. 1 caps. This would result in considerable energy savings.

EXAMPLE 3

Two pairs of caps were tested on electrodes employing a CM type which was that of FIG. 3. The protruding nose at the weld face was 0.250" diameter with a 1/16" taper over its ¼" length. The nose in this instance was twice as long as in the case of the cap of FIG. 2.

The weld test performance in these tests was as shown in Table 3.

TABLE 3
WELDING TEST RESULTS ON FIG. 3 DISPERSION-STRENGTHENED COPPER CAPS

| Weld No. | Weld Current (amperes) | Equivalent Weld Nugget Diameter (inches) |
|---|---|---|
| Pair #1 | | |
| 100 | 6,500 | .149 |
| 200 | 7,200 | .159 |
| 250 | 7,800 | .158 |
| 275 | 8,000 | .234 |
| 400 | 9,500 | .181 |
| 475 | 10,600 | .257 |
| 600 | 10,600 | .251 |
| 750 | 10,600 | .237 |
| 1000 | 10,600 | .189 |
| 1250 | 10,600 | .183 |
| 1500 | 10,600 | .199 |
| 1750 | 10,600 | .215 |
| 2000 | 10,600 | .215 |
| 2250 | 10,600 | .211 |
| 2500 | 10,600 | .207 |
| 2750 | 10,600 | .200 |
| 3000 | 10,600 | .157 |
| 3400 | 12,000 | .212 |
| 3600 | 12,000 | .229 |
| 3800 | 12,000 | .220 |
| 4000 | 12,000 | .225 |
| 4200 | 12,000 | .228 |
| 4500 | 12,000 | .244 |
| 4750 | 12,000 | .230 |
| 5000 | 12,000 | .216 |
| 5250 | 12,000 | .216 |
| 5500 | 12,000 | .211 |
| 5750 | 12,000 | .198 |
| 6000 | 12,000 | .210 |
| 6250 | 12,000 | .214 |
| 6500 | 12,000 | .221 |
| 6750 | 12,000 | .235 |
| 7000 | 12,000 | .241 |
| 7250 | 12,000 | .205 |
| 7500 | 12,000 | .178 |
| 7750 | 12,000 | .175 |
| 8000 | 12,500 | .166 |
| 8250 | 13,000 | .185 |
| 8500 | 13,500 | .228 |
| 8750 | 13,500 | .178 |
| 9000 | 13,500 | .125 |
| Pair #2 | | |
| 300 | 9,000 | .203 |
| 500 | 10,000 | .145 |
| 750 | 11,000 | .239 |
| 1000 | 11,000 | .204 |
| 1250 | 11,000 | .244 |
| 1500 | 11,000 | .228 |
| 1750 | 11,000 | .217 |
| 2000 | 11,000 | .224 |
| 2250 | 11,000 | .190 |
| 2500 | 11,000 | .194 |
| 2750 | 11,000 | .220 |
| 3000 | 11,000 | .240 |
| 3250 | 11,000 | .198 |
| 3500 | 11,000 | .178 |
| 3750 | 11,500 | .203 |
| 4000 | 11,500 | .210 |
| 4250 | 11,500 | .157 |
| 4500 | 12,000 | .217 |
| 4750 | 12,000 | .188 |
| 5000 | 12,500 | .217 |
| 5250 | 12,500 | .235 |
| 5500 | 12,500 | .223 |
| 5750 | 12,500 | .220 |
| 6000 | 12,500 | .228 |
| 6250 | 12,500 | .224 |
| 6500 | 12,500 | .219 |
| 7000 | 12,500 | .235 |
| 7250 | 12,500 | .214 |
| 7500 | 12,500 | .221 |
| 7750 | 12,500 | .208 |
| 8000 | 12,500 | .130 |
| 8250 | 13,000 | .173 |
| 8500 | 13,500 | .216 |
| 8750 | 13,500 | — |

These two pairs of caps thus produced about twice the number of welds as the FIG. 2 caps and four times the number of welds as the FIG. 1 caps. Also, they produced full size nuggets at much lower current levels than the caps of FIG. 1 and have the potential for considerable energy savings.

EXAMPLE 4

A pair of FIG. 3-shaped caps were made from copper alloyed with 0.15 weight percent Zr (RWMA Class II alloy). These were tested in a manner like the caps of Example 3, above. The results were as follows:

TABLE 4

WELDING TEST RESULTS ON CONTROLLED MUSHROOMING (GEOMETRY OF FIG. 3)
Cu-.15 wt. % Zr Caps

| Weld No. | Weld Current (amperes) | Equivalent Weld Nugget Diameter (inches) |
|---|---|---|
| 100 | 8,500 | .188 |
| 150 | 9,300 | .060 |
| 152 | 10,000 | .215 severe sticking |
| 153 | 9,500 | — |
| 180 | 9,500 | .185 |
| 194 | 9,500 | .170 |
| 199 | 9,500 | .160 |
| 200 | 9,700 | .184 |
| 230 | 10,300 | — |
| 235 | 10,300 | — |
| 240 | 10,500 | .150 |
| 241 | 11,000 | .062 |
| 243 | 11,500 | * |

*Both electrodes stuck badly to galvanized steel and pulled off the adapters. Test therefore was terminated.

This test clearly indicated that such conventional copper alloy material cannot be used very well with the FIG. 3 cap shape. The FIG. 3 caps operate at a higher temperature than a cap shaped like a FIG. 1 cap. Evidently, the high temperature causes severe softening of such copper alloy and results in rapid mushrooming. The resulting drop in nugget size must be compensated by more frequent current increases, but this causes severe sticking.

EXAMPLE 5

A pair of "Renault Caps", described above, ⅝" main body portion diameter, female connection, nominally copper alloyed with 0.6–0.8% chromium and 0.15% zirconium, were used on an automotive assembly line tests on double-sided galvanized steel sheets about 1.2 mm thick. They gave very few satisfactory welds, and they stuck badly to the sheets, essentially in the same way as the caps of Example 4.

EXAMPLE 6

A pair of caps like that of FIG. 4, without any steel jacketing and made all of dispersion-strengthened copper, were tested like those of Example 3. The noses were slightly sturdier and the nose tips less convex to minimize expulsion of molten steel from the sides of the welds. At this writing more than 4,000 satisfactory welds have been produced consecutively and the test continues with more than half the nose length left.

The foregoing tests indicate not only the surprising durability of the instant caps for an extremely demanding resistance welding service, but also indicate that these inventive caps will have a greater tolerance to low cooling water flow periods (which often are experienced in field practice) than any previous caps made of conventional copper alloy.

We claim:

1. A cold formed or machined unitary resistance welding electrode cap formed of dispersion strengthened copper and adapted to be internally cooled with a flow of coolant, said cap having a main body portion including an inner recess for coolant at its proximal end and an elongated nose portion terminating in an integral welding tip face at its distal end and an intermediate root portion connecting the nose portion and the main body portion, and wherein said nose is slightly tapered, is at least about 5 mm long from root to tip, has horizontal cross sectional area of tip not substantially in excess of about 4/10ths that of said main body portion at its greatest extent, has nose length to nose tip width ratio not substantially in excess of about 2, and is entirely of dispersion-strengthened copper except for optional jacketing of at least part of the main body portion with another metal.

2. The cap of claim 1 wherein all horizontal cross sections are circular, said nose is coaxial with said main body portion, and the maximum outside diameter of said main body portion is between about 10 and about 30 mm.

3. The cap of claim 1 wherein said electrical and coolant connection has a locking taper.

4. The cap of claim 1 wherein the tip of said nose has a conformation that is longer than it is wide, and said tip is either round, straight or bent.

5. The cap of claim 1 wherein the dispersion-strengthened copper contains dispersion-strengthened refractory oxide in a volume concentration which is the same as that of alumina at a concentration equivalent to about 0.2–0.7 weight percent elemental aluminum.

6. The cap of claim 5 wherein said dispersion-strengthened copper contains alumina in a concentration between about 0.25 and about 0.6 weight percent measured as elemental aluminum.

7. A process for welding steel surfaces together, at least one of which steel surfaces includes a zinc-coating, which comprises contacting opposite sides of the weld joint with resistance welding electrodes and passing an electric current therethrough of sufficient density to weld the surfaces together, the electrode or electrodes in contact with a zinc coated surface or surfaces including a cold formed or machined unitary resistance welding electrode cap formed of dispersion strengthened copper containing between about 0.25% and about 0.6% alumina by weight measured as equivalent aluminum, cooling said electrode cap internally with a flow of coolant, said electrode cap having a main body portion including an inner recess for receiving coolant at its proximal end, and a nose portion terminating in an integral welding tip face at its distal end, and an intermediate root portion disposed between the nose portion and the main body portion, and wherein said nose is slightly tapered, is at least about 5 mm long from root to tip, has horizontal cross sectional area of tip not substantially in excess of about 4/10ths that of said main body portion at its greatest extent, has nose length to nose tip width ratio not substantially in excess of about 2, and is entirely of dispersion-strengthened copper except for optional jacketing of at least part of the main body portion with another metal.

8. The process of claim 7 wherein said zinc-coated metal is double-sided galvanized steel.

9. A process as defined in claim 7 wherein the welding tip face has a transverse convex profile.

10. A process as defined in claim 7 wherein the root portion includes a concave profile between the main body portion and the welding tip.

11. A process as defined in claim 7 wherein the nose portion has a taper between zero and 20°.

12. A process as defined in claim 7 wherein the nose portion has a taper between zero and 10°.

13. A process for welding steel surfaces together, at least one of which steel surfaces includes a zinc-coating, which comprises contacting opposite sides of the weld joint with resistance welding electrodes and passing an electric current therethrough of sufficient density to weld the surfaces together, the electrode or electrodes in contact with a zinc coated surface or surfaces including a cold formed or machined unitary resistance welding electrode cap formed for dispersion strengthened copper cooling said electrode cap internally with a flow of coolant, said electrode cap having a main body portion including an inner recess for receiving coolant at its proximal end, and a nose portion terminating in an integral welding tip face at its distal end, and an intermediate root portion disposed between the nose portion and the main body portion, and wherein said nose is slightly tapered, is at least about 5 mm long from root to tip, has horizontal cross sectional area of tip not substantially in excess of about 4/10ths that of said main body portion at its greatest extent, has nose length to nose tip width ratio not substantially in excess of about 2, and is entirely of dispersion-strengthened copper except for optional jacketing of at least part of the main body poriton with another metal.

* * * * *